(12) United States Patent
Rosenmayer

(10) Patent No.: US 12,375,600 B1
(45) Date of Patent: Jul. 29, 2025

(54) MOBILE DEVICE CASE WITH USER INPUT AND POWER ADAPTER

(71) Applicant: Jason Andrew Rosenmayer, Grand Cayman (KY)

(72) Inventor: Jason Andrew Rosenmayer, Grand Cayman (KY)

(73) Assignee: Jason Andrew Rosenmayer, Grand Cayman (KY)

( * ) Notice: Subject to any disclaimer, the term of this patent is extended or adjusted under 35 U.S.C. 154(b) by 0 days.

(21) Appl. No.: 18/970,091

(22) Filed: Dec. 5, 2024

(51) Int. Cl.
*H04M 1/7246* (2021.01)
*H04M 1/72466* (2021.01)
*H04M 1/72469* (2021.01)

(52) U.S. Cl.
CPC ..... *H04M 1/7246* (2021.01); *H04M 1/72466* (2021.01); *H04M 1/72469* (2021.01)

(58) Field of Classification Search
CPC ............. H04M 1/6033; H04M 1/0274; H04M 1/0254; H04M 1/724092; H04M 1/0249; H04M 1/0262; H04M 1/04; H04M 1/6058; H04M 1/72409; H04M 1/72412; H04M 1/0283; H04M 1/21; H04M 1/7246; H04M 1/0202
See application file for complete search history.

(56) References Cited

U.S. PATENT DOCUMENTS 9,281,859 B1 3/2016 Lee
9,793,940 B2 10/2017 Otsubo et al.
2015/0141093 A1* 5/2015 Sela .......................... F23Q 2/36
                                                     455/575.8
2015/0189053 A1* 7/2015 LaHam .................... H04M 1/11
                                                     455/575.1
2016/0315652 A1* 10/2016 Tabatabai ................ H04M 1/03
2018/0131802 A1* 5/2018 Cho ..................... G06F 3/04886

FOREIGN PATENT DOCUMENTS

| KR | 10-2007-0045746 A | 5/2007 |
| KR | 1478522 B1 | 1/2015 |
| KR | 20150002600 | 7/2015 |
| KR | 20160000533 | 2/2016 |
| KR | 10-2017-0085798 A | 7/2017 |
| KR | 10-2017-0140507 A | 12/2017 |

(Continued)

*Primary Examiner* — Golam Sorowar
(74) *Attorney, Agent, or Firm* — HOVEY WILLIAMS LLP

(57) ABSTRACT

A detachable case for a mobile device includes a cover body, a user input device, a microprocessor, and an adapter. The user input device is attached to a back side of the cover body and is configured to generate a signal based on user input. The microprocessor is configured to receive the signal based on user input. The adapter is attached to the sidewall and includes a case connector and a case receptacle. The case connector extends into the inner space and is operable to be inserted into a receptacle of the mobile device. The case connector has a case data contact operable to contact a device data contact and two case power contacts operable to contact two device power contacts. The case receptacle has two charging power contacts electrically connected to the two case power contacts. The microprocessor is electrically connected to the device data contact and the two device power contacts.

15 Claims, 15 Drawing Sheets

(56) References Cited

FOREIGN PATENT DOCUMENTS

| KR | 10-2019-0059359 A | 5/2019 | | |
|----|----|----|----|----|
| KR | 10-2021-0033282 A | 3/2021 | | |
| KR | 2372938 B1 | 3/2022 | | |
| KR | 2397561 B1 | 5/2022 | | |
| KR | 2449962 B1 | 9/2022 | | |
| KR | 2551355 B1 | 7/2023 | | |
| WO | WO-2013179154 A1 * | 12/2013 | ............... | F23Q 2/32 |

* cited by examiner

MOBILE DEVICE CASE WITH USER INPUT AND POWER ADAPTER

BACKGROUND OF THE INVENTION

Since the advent of smart devices, such as smartphones, tablets, and the like, screen times or usage rates of such devices have surged dramatically. This has given rise to a set of ergonomic and health-related challenges. Users often experience discomfort or pain in their hands, wrists, and fingers due to the repetitive and awkward hand positions required to interact with touchscreen devices. This can cause and/or exacerbate conditions such as tendinitis and carpal tunnel syndrome.

Moreover, the typical design of mobile devices, which primarily features a single touchscreen on one surface, presents inherent limitations. Touchscreens enable a wide range of graphical user interfaces; however, touchscreens often place a choke point on the number of inputs a user can enter and therefore a rate at which the user can input data. For example, most users type using their thumbs while their fingers remain unused.

Thus, there is a need for a means of reducing physical strain caused by mobile device usage while increasing a rate of input a user can enter into a mobile device.

SUMMARY OF THE INVENTION

Embodiments of the current invention address one or more of the above-mentioned problems and provide a distinct advance in the art of mobile devices and particularly in the art of cases for mobile devices.

One embodiment of the invention is a detachable case for a mobile device having a device receptacle with a device data contact and two device power contacts. The detachable case includes a cover body, a user input device, a microprocessor, and an adapter. The cover body is configured to be detachably mounted on the mobile device and has a back side and a sidewall defining an inner space for receiving the mobile device. The user input device is attached to the back side of the cover body and is configured to generate a signal based on user input. The microprocessor is in communication with the user input device and is configured to receive the signal based on user input.

The adapter is attached to the sidewall and includes a case connector and a case receptacle. The case connector extends into the inner space and is operable to be inserted into the device receptacle. The case connector has a case data contact operable to contact the device data contact and two case power contacts operable to contact the two device power contacts. The case receptacle has two charging power contacts electrically connected to the two case power contacts. The microprocessor is electrically connected to the device data contact and the two device power contacts. This enables the mobile device to be connected to a connector and charging while the detachable case is on and while the user input device is being used.

A detachable case according to another embodiment of the invention includes a cover body, a first user input device, a second user input device, a case connector, a microprocessor, and a toggle switch. The cover body is configured to be detachably mounted on the mobile device and has a back side and a sidewall defining an inner space for receiving the mobile device. The first user input device is attached to the back side of the cover body and is configured to generate a first signal. The second user input device is attached to the back side of the cover body and is configured to generate a second signal. The case connector extends into the inner space and is operable to be inserted into the device receptacle. The case connector has a case data contact operable to contact the device data contact and two case power contacts operable to contact the two device power contacts. The microprocessor is in communication with the first user input device, the second user input device, the device data contact, and the two device power contacts.

The toggle switch is attached to the cover body and is shiftable between first and second states. When the toggle switch is in the first state, the microprocessor transmits to the case data contact a first control signal based on the first user input signal and a second control signal based on the second user input signal. When the toggle switch is in the second state, the microprocessor only transmits the first control signal to the case data contact. This enables the case to have multiple modes of use with the user inputs, such as, for example, a single-hand mode and a two-hand mode.

Another embodiment of the invention is a non-transitory computer readable media having instructions stored thereon that when executed by a processor, cause the processor to receive a user-defined list of selected user input devices out of multiple user input devices. The selected user input devices being selected for activation when in a custom mode. The instructions may further cause the processor to determine that a toggle switch is in a state representative of a selection of the custom mode; receive user input signals from the selected user input devices; and transmit a control signal based only on the user input signals from the selected user input devices.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

Figure 1:
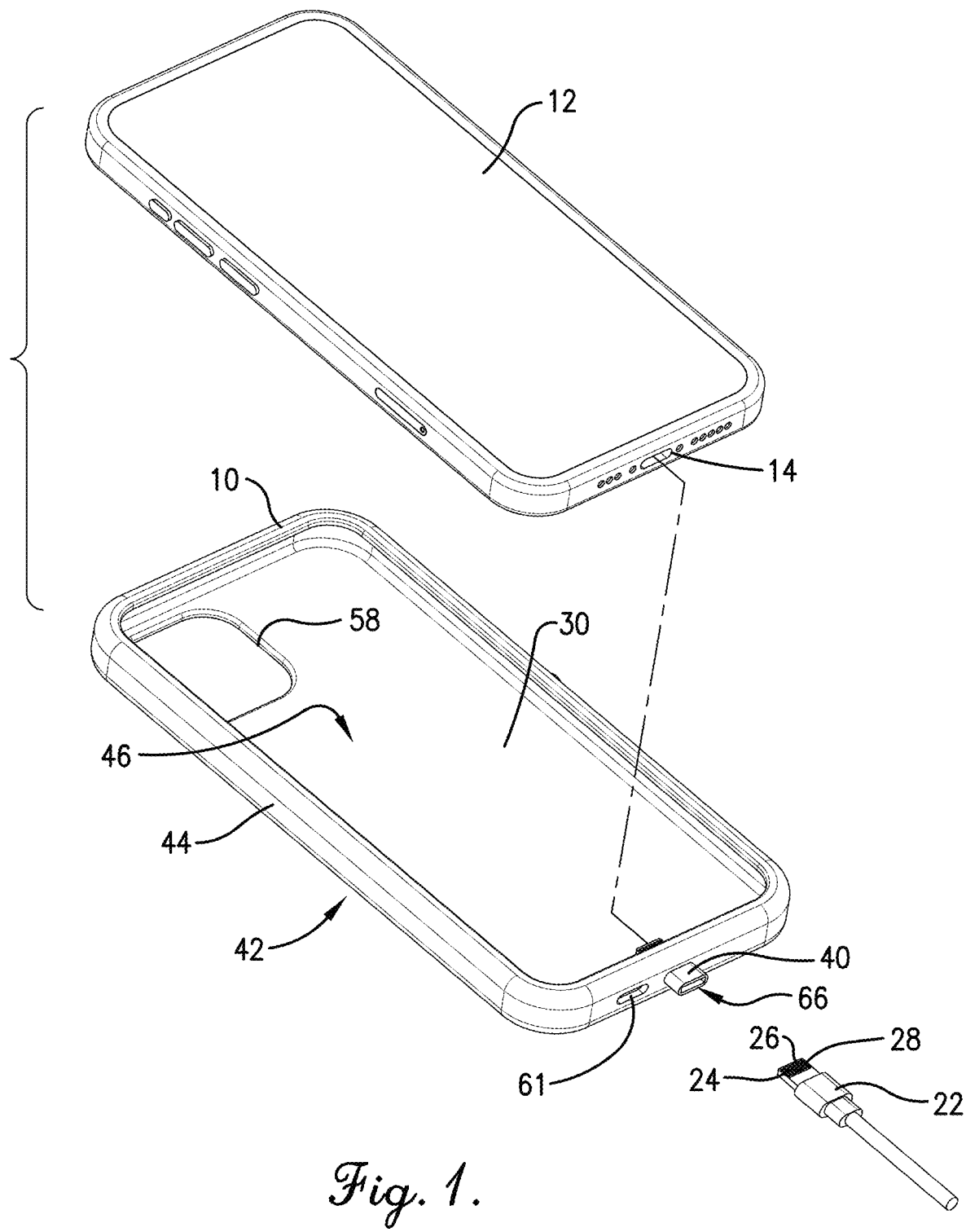
FIG. 1 is a perspective view of a detachable case constructed according to an embodiment of the invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Turning to FIG. 1, a detachable case 10 for a mobile device 12 is depicted. The mobile device 12 may be a smartphone, a tablet, an e-reader, or the like. The mobile device 12 has a device receptacle 14 with one or more device data contacts 16 (schematically depicted in FIG. 7) and two or more device power contacts 18, 20 (also depicted in FIG. 7). The mobile device 12 is operable to connect to a connector 22 also having one or more data contacts 24 and two or more power contacts 26, 28. As used herein, "a data contact" refers to an electrically conductive contact designated by circuitry for transferring data between devices, and a "power contact" refers to an electrically conductive designated by circuitry for transferring electrical power, including a ground contact and/or a relatively higher voltage.

The detachable case 10 includes a cover body 30, one or more user input devices 32, 34, 36 (shown in FIG. 2), a processing element 38 (depicted in FIG. 7), and an adapter 40. The cover body 30 is configured to be detachably mounted on the mobile device 12 and has a back side 42 and one or more sidewalls 44 defining an inner space 46 for receiving the mobile device 12.

Figure 2:
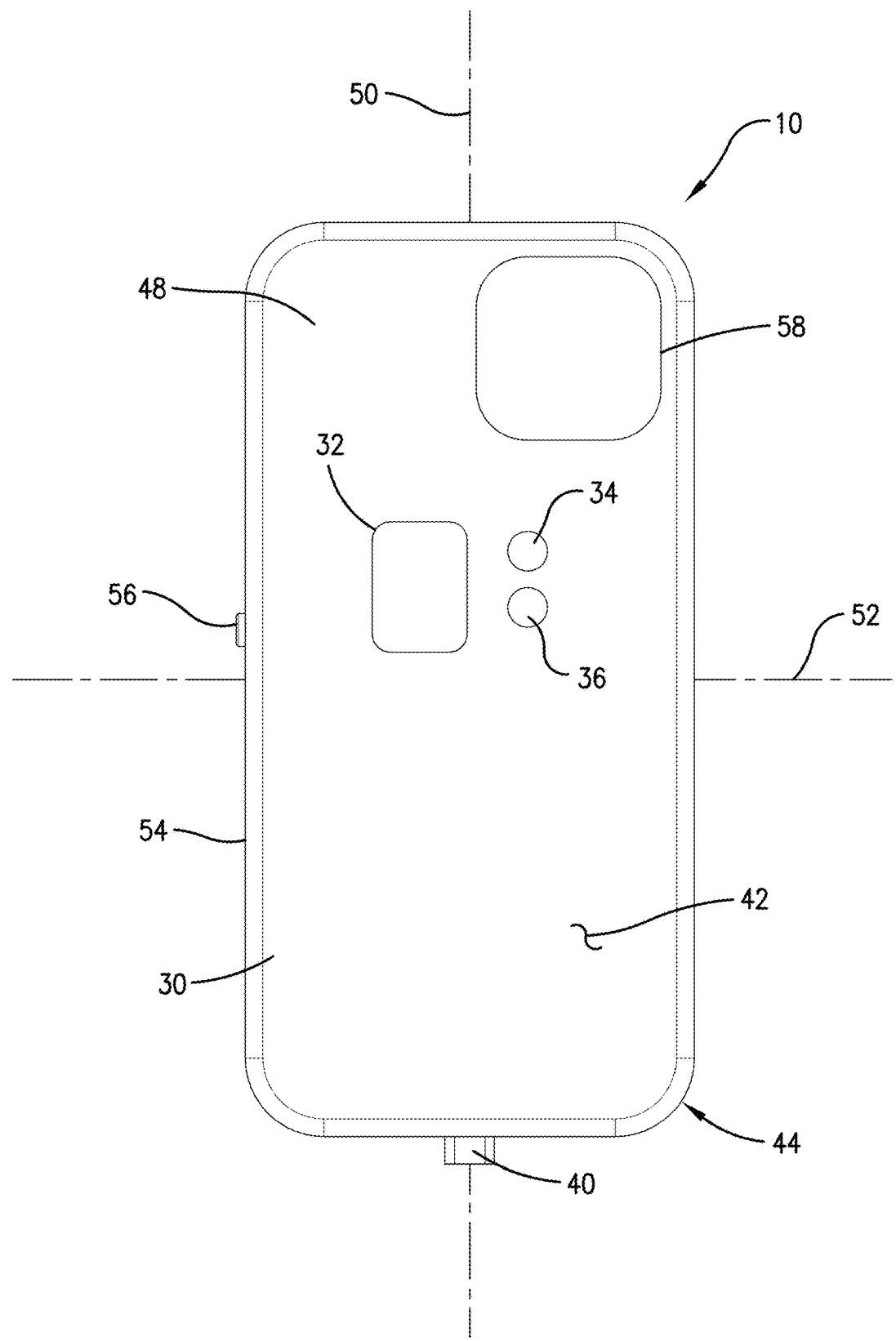
FIG. 2 is a plan view of a back side of the detachable case of FIG. 1.

Turning to FIG. 2, the user input devices 32, 34, 36 are attached to the back side 42 of the cover body 30 and are configured to generate signals based on user input. For example, user input device 32 is a scrolling device, such as a touch pad, configured to detect swipes in two or more directions and generate a signal based on the swipes. However, the scrolling device 32 may be any type of scrolling device without departing from the scope of the present invention, including a joystick, scrolling wheel, or an optical sensor. In one or more embodiments, input devices 34, 36 comprise buttons. The buttons 34, 36 comprise push buttons; however, the buttons 34, 36 may be any type of button without departing from the scope of the present invention, including touch pad buttons, rubber dome switches, or the like.

The user input devices 32, 34, 36 may be located to optimize ergonomics for a person with adult sized hands. The user input devices 32, 34, 36 are located on a top half 48 of the back side 42. Or in other words, when the case 10 is oriented so that its longitudinal axis 50 is vertical, the upper half 48 of the back side 42 is above the lateral axis 52 of the case 10 or closer to the top end than the bottom end of the case 10. The buttons 34, 36 may be horizontally aligned with a portion of the scrolling device 32 and laterally spaced from the scrolling device 32. In one or more embodiments, the buttons 34, 36 are positioned to the right of the scrolling device 32 on the back side 42 to accommodate right-handed people. The top button 34 may be vertically aligned with the bottom button 36 positioned below the top button 34. However, the buttons 34, 36 and the scrolling device 32 may be arranged any number of ways without departing from the scope of the present invention. For example, the buttons 34, 36 may be positioned to the left of the scrolling device 32 when viewing the back side of the case 10 in its vertical orientation to accommodate left handed users.

In one or more embodiments, the sidewalls 44 includes a longitudinal sidewall 54 in which one or more additional user input devices 56 are attached. The additional user input device 56 may likewise be a button and is positioned on an opposite side of the scrolling device 32 as the other buttons 34, 36. This allows a user to operate the additional user input device 56 with their thumb. However, the additional user input device 56 may be any type of input device, such as a button, scroll wheel, touch pad, or the like, without departing from the scope of the present invention. Additionally, the user input devices 32, 34, 36, 56 may be located in any number of places on the back side 42 and located relative to one another any number of ways without departing from the scope of the present invention.

Figure 3:
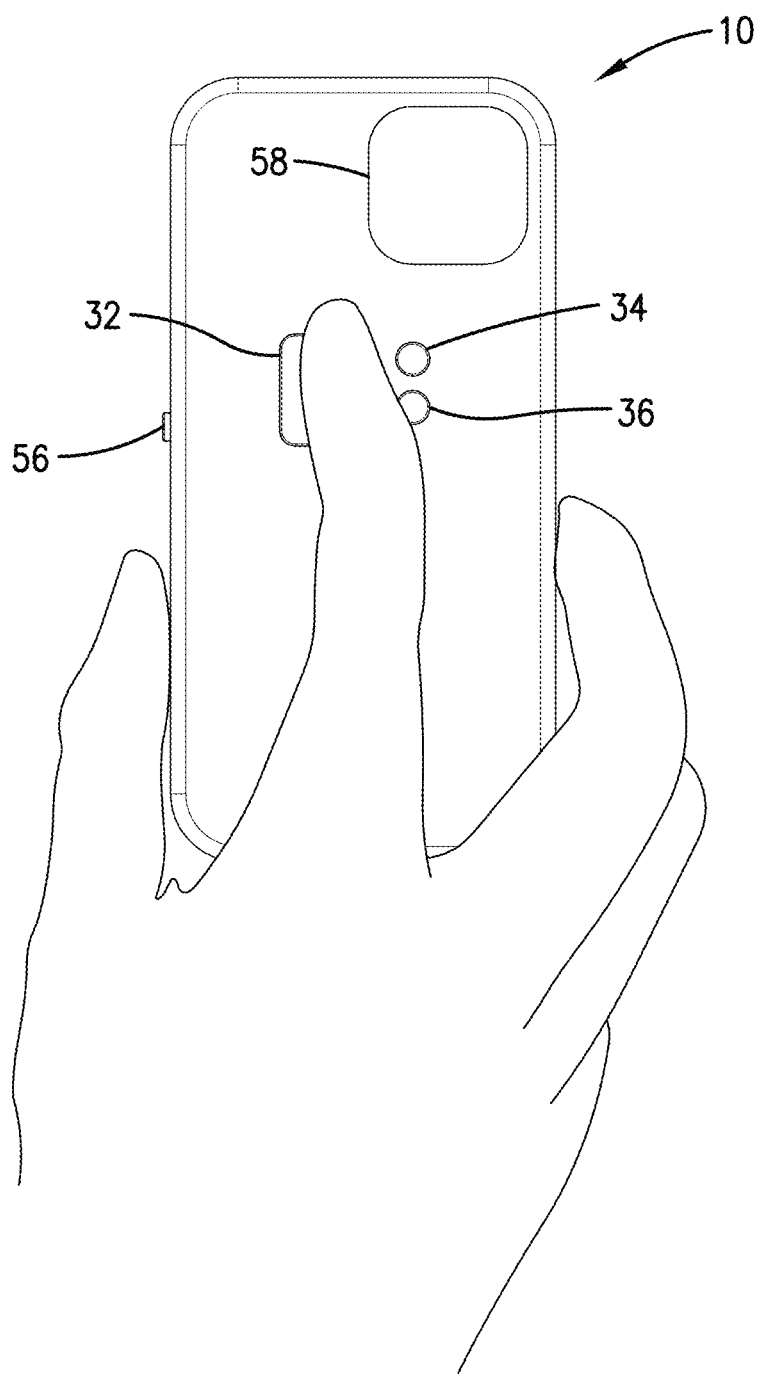
FIG. 3 is a plan view of the back side of the detachable case of FIG. 1 demonstrating one intended use of the detachable case.
Figure 4:
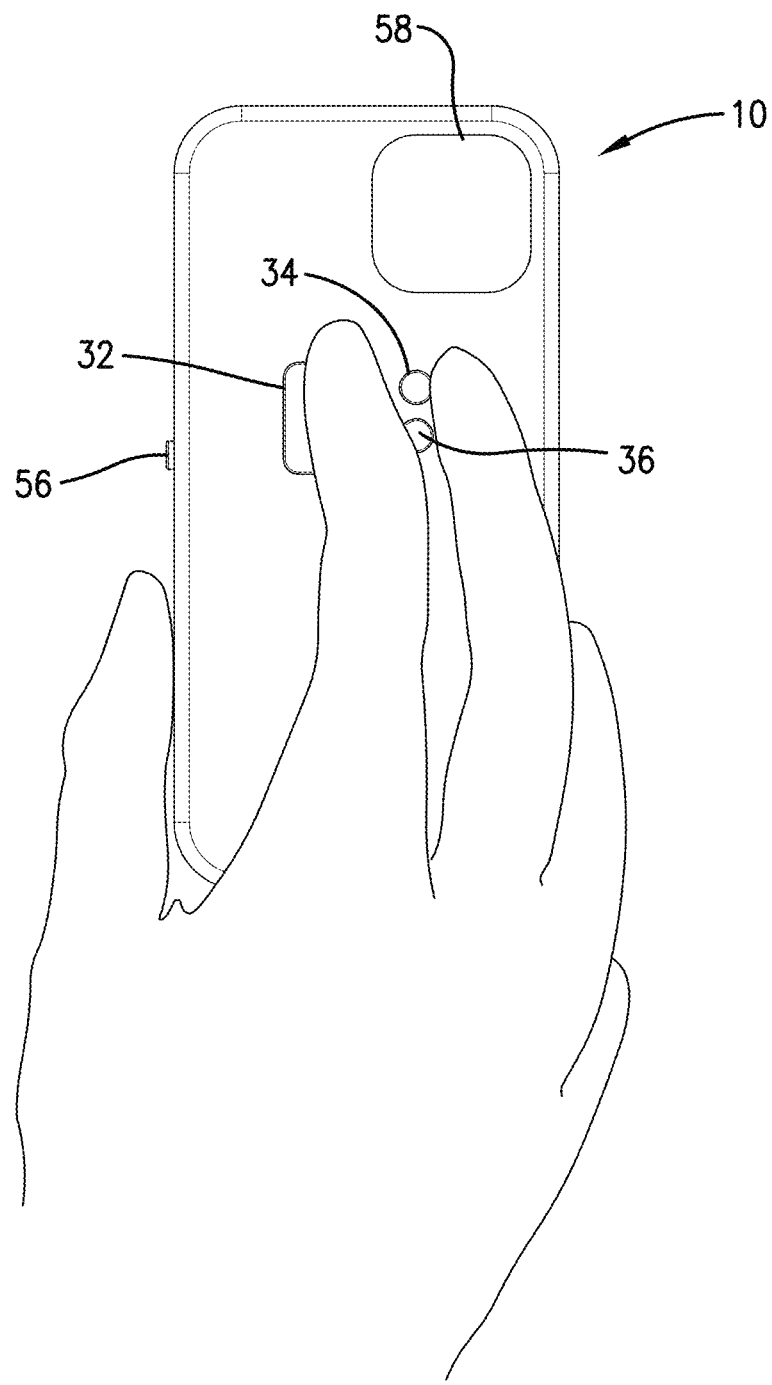
FIG. 4 is a plan view of the back side of the detachable case of FIG. 1 demonstrating another intended use of the detachable case.
Figures 5, 6:
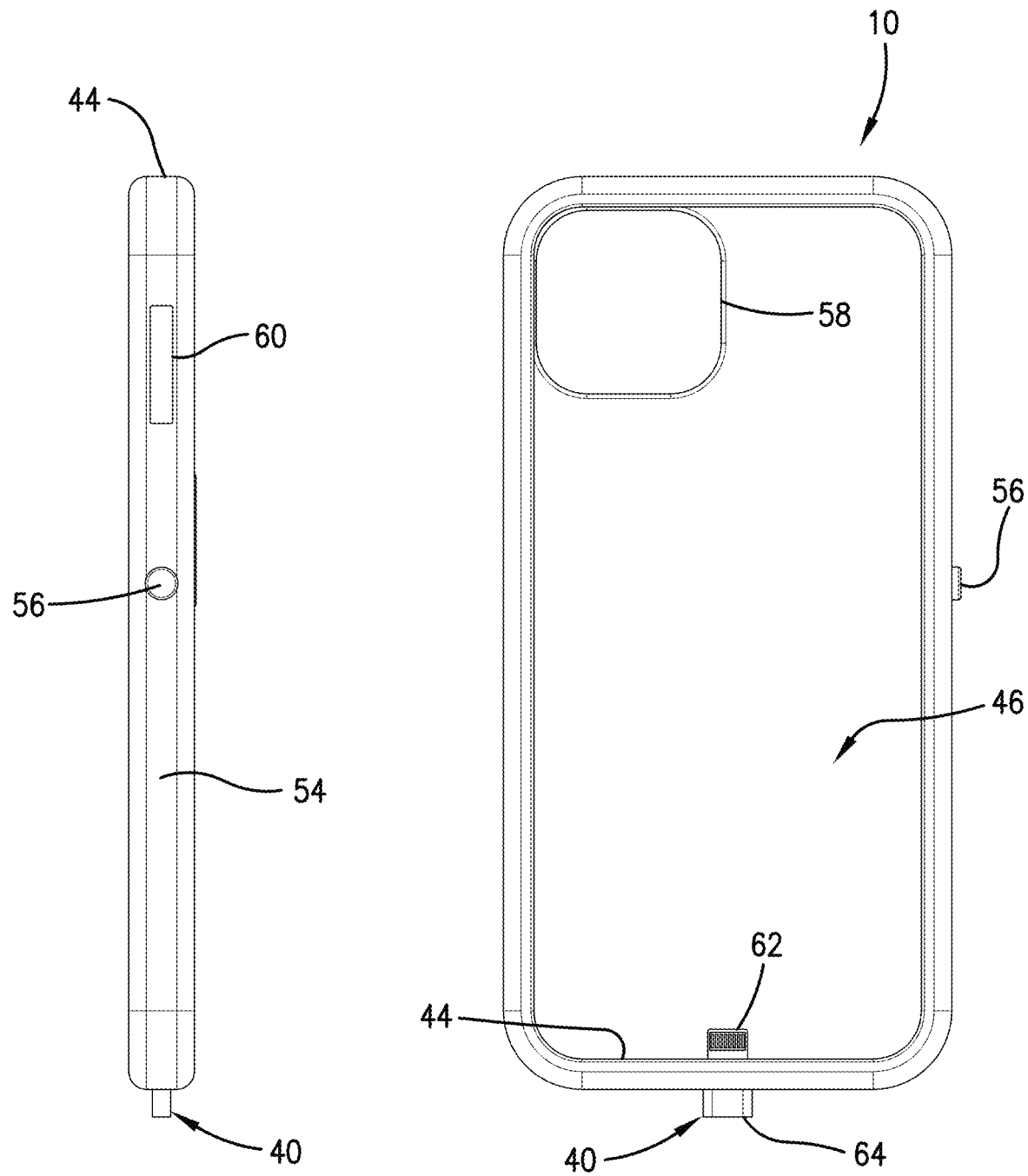
FIG. 5 is a plan view of a right side of the detachable case of FIG. 1.
FIG. 6 is a plan view of a front side of the detachable case of FIG. 1.

As shown in FIG. 3, the relative positions of the user input devices 32, 34, 36 allow for an index finger to be used to, for example, scroll on a page of an application of the mobile device 12 via the scrolling device 32 and interact with the application using the buttons 34, 36. Additionally, the thumb may be used to engage the additional user input device 56 and/or for the touchscreen of the mobile device 12. Additionally, as shown in FIG. 4, the relative positions of the user input devices 32, 34, 36 allow for the user to use, for example, the index finger on the scrolling device 32, the middle finger on the buttons 34, 36, and the thumb on the additional button 56 and/or on the touchscreen. In one or more embodiments, the case 10 further includes one or more camera openings 58. Additionally, as shown in FIG. 5, one or more of the longitudinal walls 54 of the sidewalls 44 includes one or more openings 60 for power buttons and/or volume controls of the mobile device 12. Additionally, as shown in FIG. 1, one or more of the sidewalls 44 includes one or more openings 61 for a microphone and/or speaker of the mobile device 12.

Turning to FIG. 6, the adapter 40 is attached to one of the sidewalls 44 and includes a case connector 62 and a case receptacle 64. The case connector extends 62 into the inner space 46 and is operable to be inserted into the device receptacle 14 (shown in FIG. 1). The case receptacle 64 includes an opening 66 (shown in FIG. 1) for receiving the connector 22 of the mobile device (shown in FIG. 1). While the figures depict the case connector 62 and case receptacle 64 being connected and extending from a shared portion of the sidewall 44, the case connector 62 and case receptacle 64 can be positioned at different locations without departing from the scope of the present invention.

Figure 7:
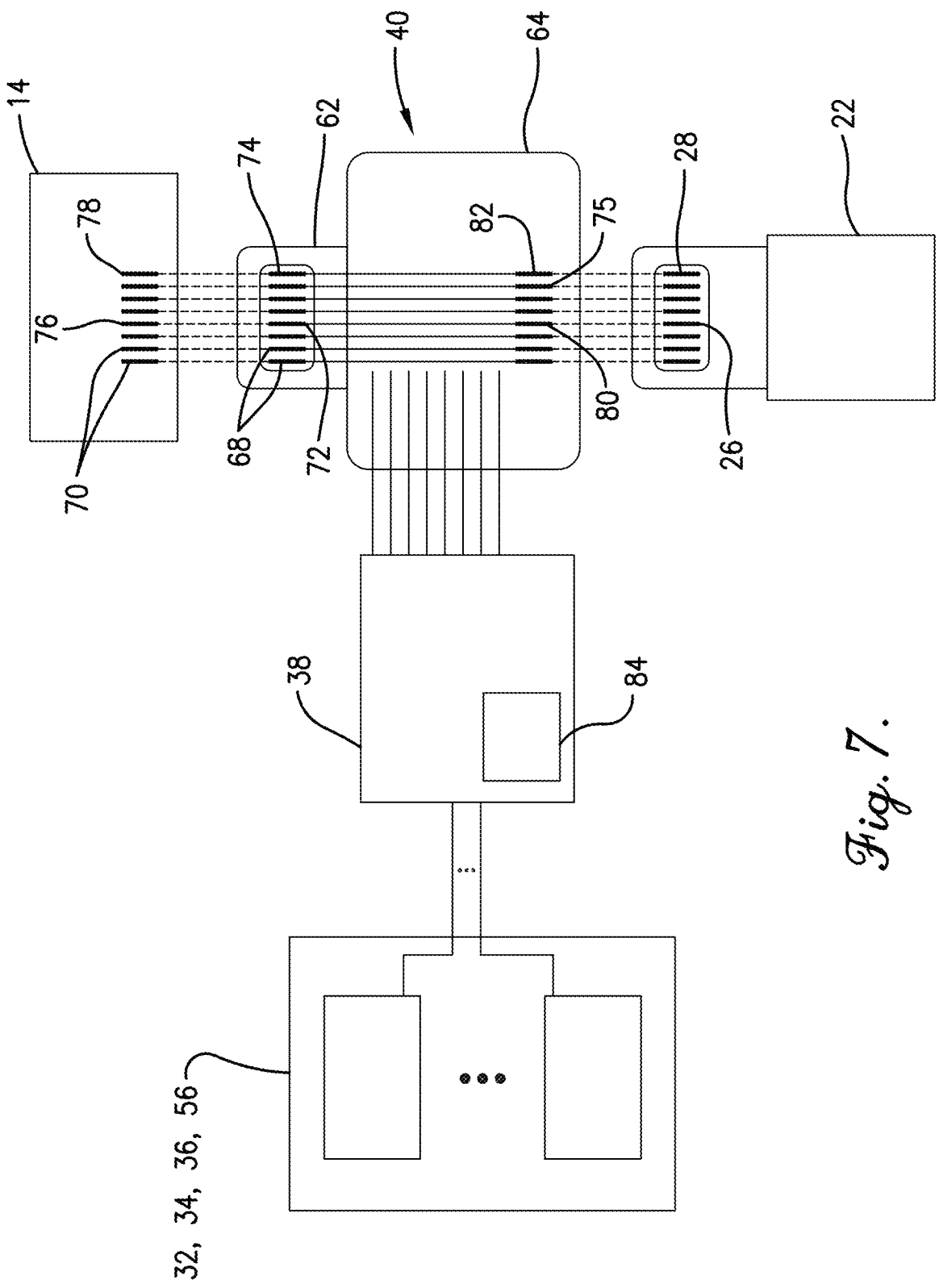
FIG. 7 is block diagram depicting selected components of the detachable case of FIG. 1.

Turning to FIG. 7, selected components of the case 10 are schematically depicted in relation to connections made with the connector 22 of the external cord and the receptacle 14 of the mobile device 12. The case connector 62 has one or more case data contacts 68 operable to contact one or more device data contacts 70 and two or more case power contacts 72, 74 operable to contact two or more device power contacts 76, 78. The case receptacle 64 has two or more charging power contacts 80, 82 electrically connected to two or more case power contacts 72, 74 and operable to contact the two or more power contacts 26, 28 of the connector 22. This allows the mobile device 12 to be charged by the connector 22 while the case 10 is attached to the mobile device 12. In one or more embodiments, the case receptacle 64 may further include data contacts 75. This allows the mobile device 12 to receive data from the connector 22 while the case 10 is attached to the mobile device 12.

The processing element 38 is in communication with the user input devices 32, 34, 36, 56 and is configured to receive signals from the user input devices 32, 34, 36, 56 based on user input. As used herein, "in communication" may include direct and/or indirect electrical connection through conductors, optical communication, digital signals, analog signal, radio-frequency communication, or the like. The processing element 38 is operable to be in communication with the device data contact(s) 70 and the two device power contacts 76, 78 when the case connector 62 is inserted into the device receptacle 14. Specifically, the processing element 38 may receive electrical power from the power contacts 26, 28 of the connector 22 and/or the device power contacts 76, 78 by way of the charging power contacts 80, 82 and/or the case power contacts 72, 74. The processing element 38 may be in communication with the device data contacts 70 by way of the case data contacts 68. This enables the mobile device 12 to be connected to the power connector 22 and charging while the detachable case 10 is attached and while the user input devices 32, 34, 36, 56 are being operated. However, in one or more embodiments, the detachable case 10 does not include a processing element 38, and the user input devices 32, 34, 36, 56 may be directly connected to the case data contacts 68 so that processing elements of the mobile device 12 processes signals from the user input devices 32, 34, 36, 56.

In one or more embodiments, the processing element is a microprocessor 38 that is embedded in the case body 30 and includes one or more memory elements 84 for data storage and operational instructions. The microprocessor 38 allows for updated software and drivers to be loaded onto the mobile device 12, and for users to set their own preferences which can be loaded onto the mobile device 12. The preferences may include left/right-handed compatibility, setting buttons to perform custom functions, inverted directional scrolling, operating system navigation, launching applications, web browsing, operating applications, camera control, and/or zoom in/out. This also allows the case 10 to be used as a "plug and play" device.

Figure 8:
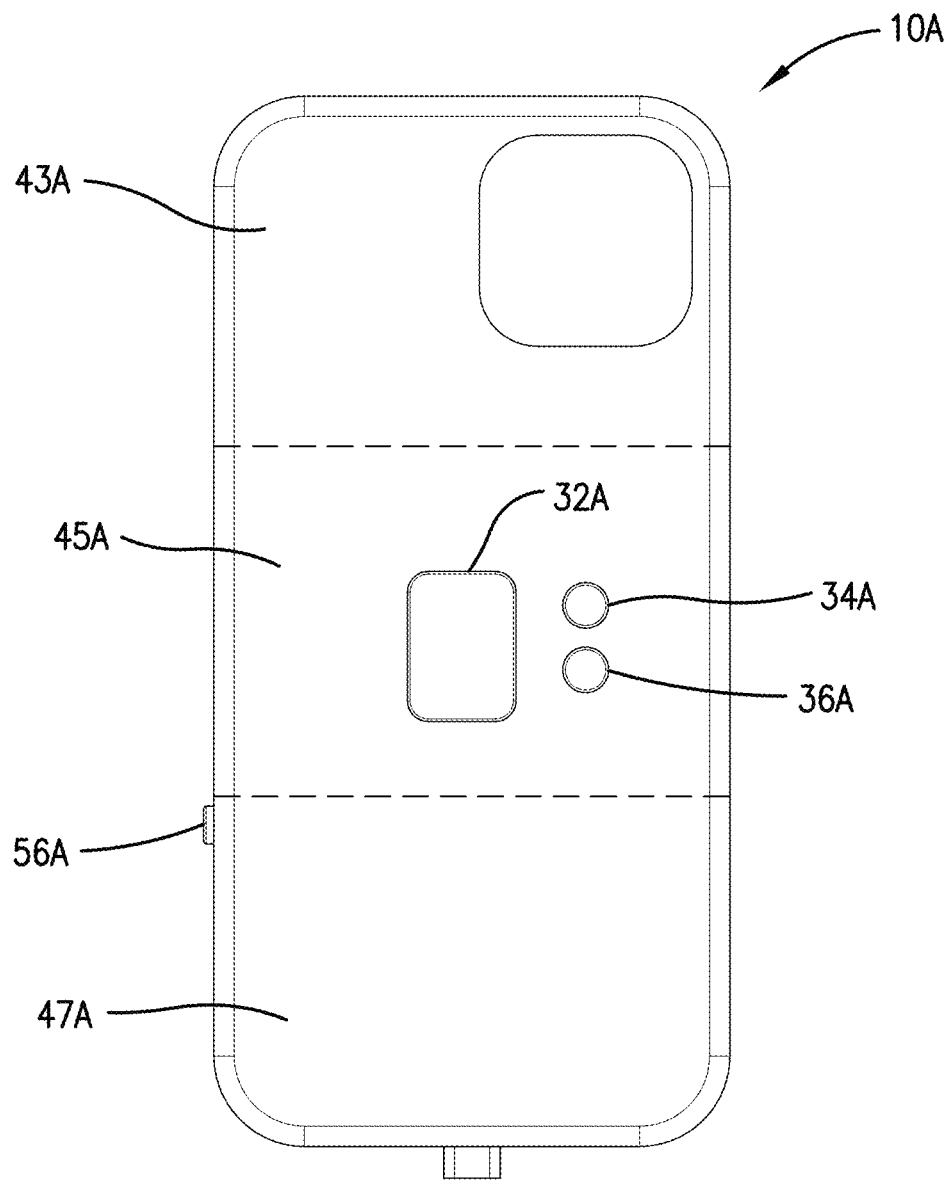
FIG. 8 is a plan view of a back side of a detachable case constructed according to another embodiment of the present invention.

A case 10A constructed in accordance with another embodiment of the invention is shown in FIG. 8. The case 10A may comprise substantially similar components as case 10; thus, the components of case 10A that correspond to similar components in case 10 have an 'A' appended to their reference numerals.

The case 10A includes all the features of case 10 except that one or more of the user input devices 32A, 34A, 36A, 56A are located lower on the case 10A (relative to the longitudinal axis when the case 10A is upright) to accommodate smaller hands, such as the hands of a child. In one or more embodiments, the scrolling device 32A and the buttons 34A, 36A are located in a middle third 45A of the back side 42A between a top third 43A and a bottom third 47A. In one or more embodiments, the side button 56A is located at least partially in the lower third 47A region of the case 10A. In one or more embodiments, the side button 56A is positioned mostly on the lower third 47A of the case 10A.

Figure 9:
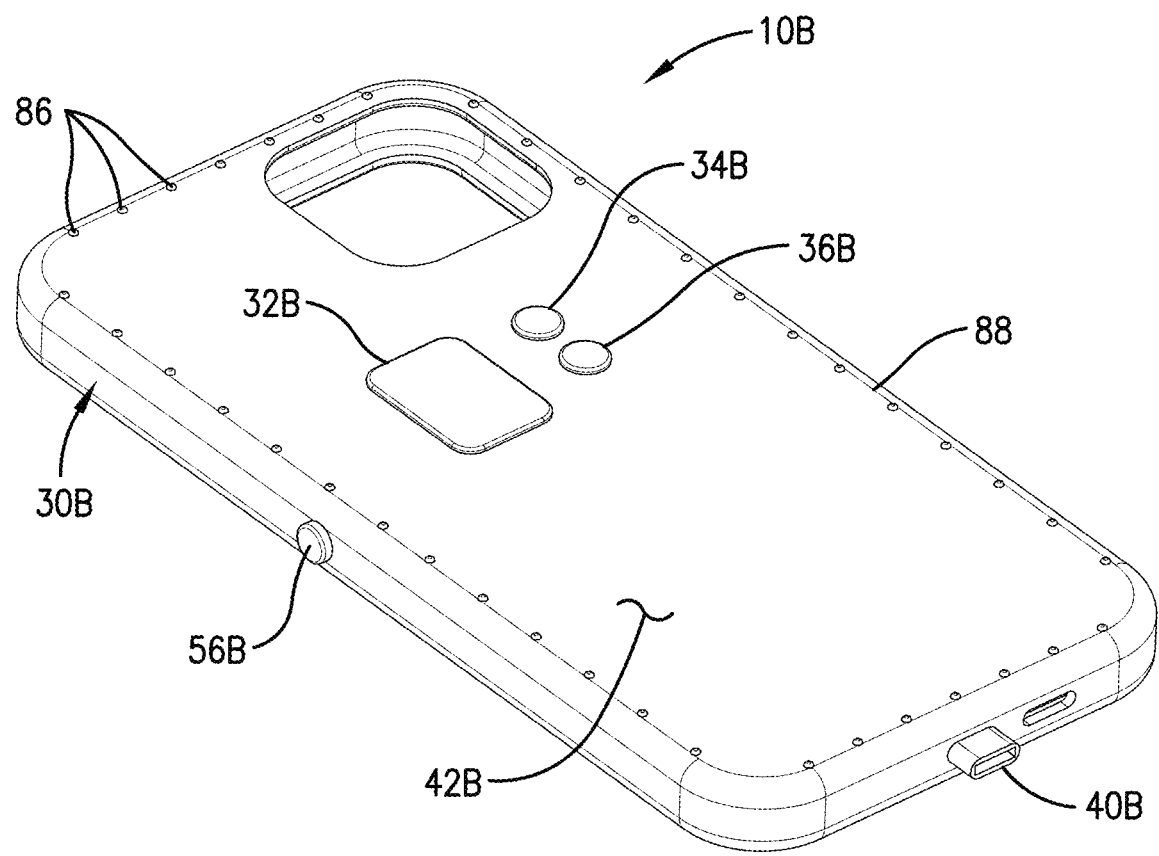
FIG. 9 is a perspective view of a back side of a detachable case constructed according to another embodiment of the present invention in which the detachable case includes light elements.

A case 10B constructed in accordance with another embodiment of the invention is shown in FIG. 9. The case 10B may comprise substantially similar components as case 10; thus, the components of case 10B that correspond to similar components in case 10 have a 'B' appended to their reference numerals.

The case 10B includes all the features of case 10 and further comprises a plurality of light elements 86 attached to the back side 42B of the cover body 30B. In one or more embodiments, the light elements 86 are located on outer margins 88 of the back side 42B. The light elements 86 may include light emitting diodes (LEDs) or the like. In one or more embodiments, the light elements 86 comprise color-changing red-green-blue (RGB) lighting strips.

The microprocessor and/or other circuit components, such as transistors or the like, may be used to provide power to the light elements 86 supplied by the charging connector and/or the mobile device through the power contacts of the adapter 40B. In one or more embodiments, the microprocessor may be configured to activate the light elements 86 based on a signal from the mobile device and/or from one or more of the user input devices 32B, 34B, 36B, 56B.

For example, the microprocessor may be configured to activate one or more of the light elements 86 as an alternative notification tool. The microprocessor may be configured to activate one or more of the light elements 86 based on a signal from the mobile device representative of a message, call, notification when the mobile device is set on silent mode. This helps assist people with impaired hearing to know when they receive a notification. This also helps assist users to locate a misplaced mobile device or located the misplaced mobile device in a dark environment.

The microprocessor may be configured to activate one or more of the light elements in sequences involving changing colors, flashing lights, fading lights, etc. This enables following aesthetic and/or fashion trends. The light elements 86 may be located anywhere on the case 10B and in any pattern without departing from the scope of the present invention.

Figure 10:
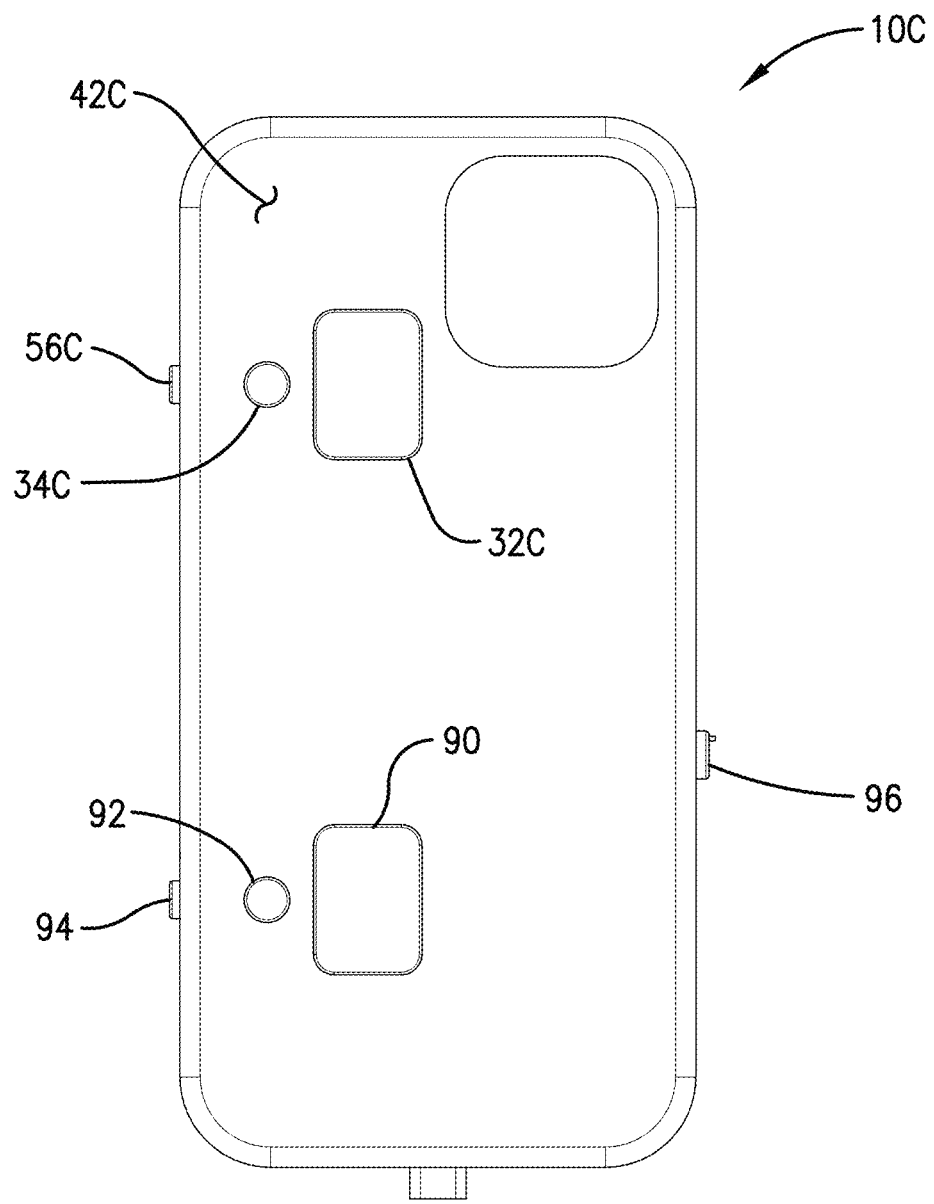
FIG. 10 is a plan view of a back side of a detachable case constructed according to another embodiment of the present invention in which the detachable case includes multiple scrolling devices.

A case 10C constructed in accordance with another embodiment of the invention is shown in FIG. 10. The case 10C may comprise substantially similar components as case 10; thus, the components of case 10C that correspond to similar components in case 10 have a 'C' appended to their reference numerals.

The case 10C includes all the features of case 10 except it only includes one button 34C on the back side 42C that is located between the first scrolling device 32C and the first side button 56C and further comprises a second set of user input devices 90, 92, 94 and one or more toggle switches 96.

In one or more embodiments, the second set of user input devices includes a scrolling device 90, a button 92 positioned to the left of the scrolling device 90, and a second side button 94. The second set of user input devices 90, 92, 94 may be located on the bottom half of the case 10C (relative to the longitudinal axis when the case 10C is vertically oriented). The button 34C, first scrolling device 32C, and first side button 56C may be horizontally aligned. Likewise, the scrolling device 90, second button 92, and second side button 94 may be horizontally aligned. In one or more embodiments, the second set of user input devices 90, 92, 94 mirror the first set of user input devices 32C, 34C, 56C across the lateral axis of the case 10C so that the first scrolling device 32C and the second scrolling device 90 are aligned vertically, and the first button 34C and the second button 92 are aligned vertically.

Figure 11:
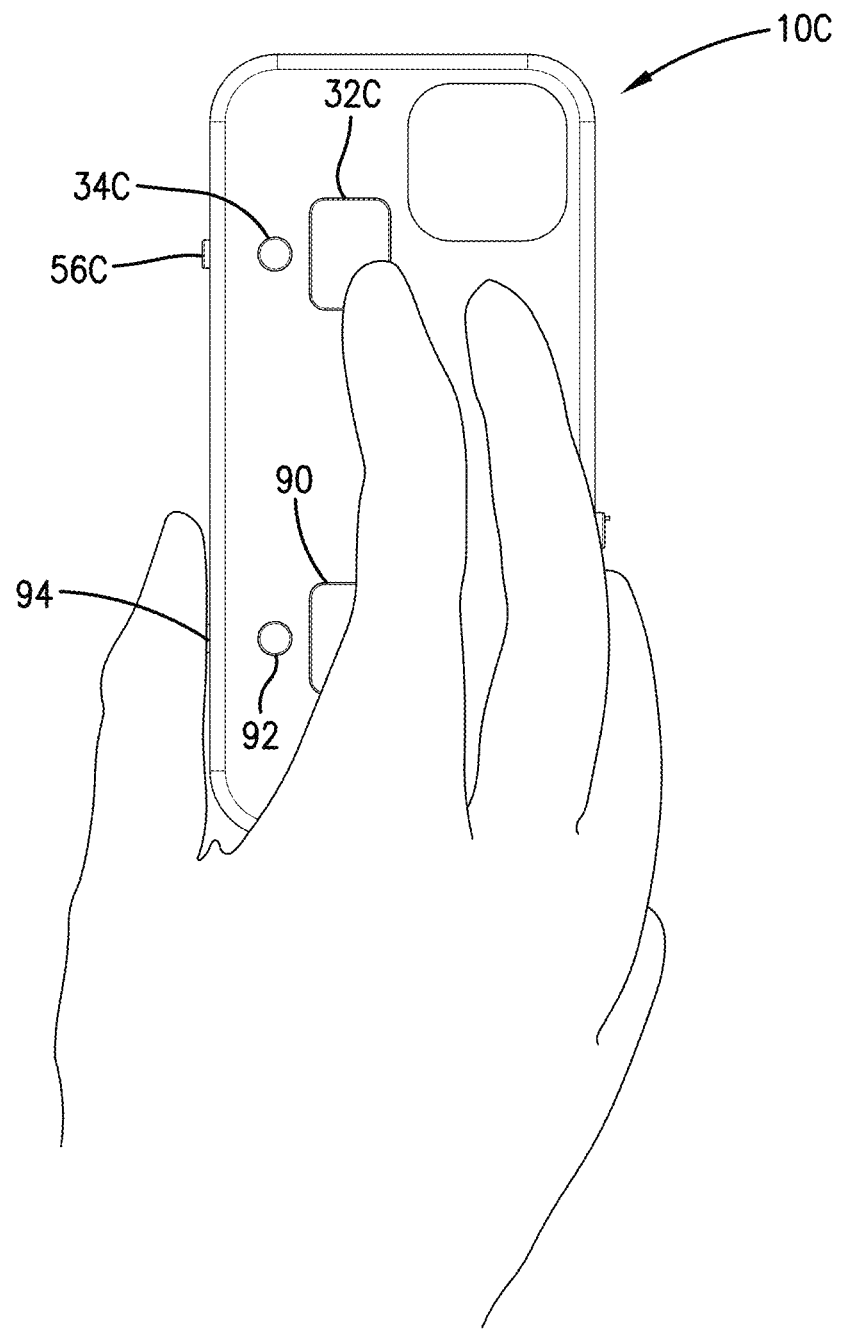
FIG. 11 is a plan view of the back side of the detachable case of FIG. 10 demonstrating one intended use of the detachable case.
Figure 12:
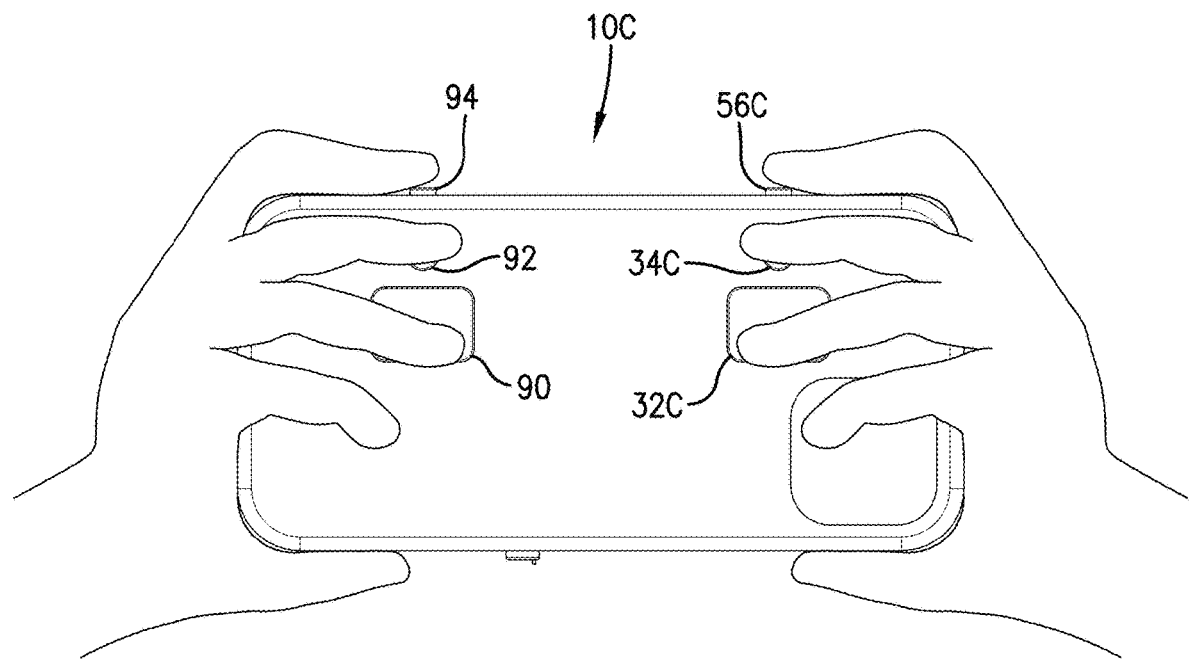
FIG. 12 is a plan view of the back side of the detachable case of FIG. 10 demonstrating another intended use of the detachable case.

The toggle switch 96 includes two or more states. The toggle switch 96 may be any type of multi-state switch, including a toggle slider, a rocker switch, an e-switch, or the like, without departing from the scope of the present invention. In one or more embodiments, the toggle switch 96 being in first state causes the microprocessor to only process signals from the first scrolling device 32C and the first button 34C, which enables convenient and ergonomic use of the first scrolling device 32C and the first button 34C, as depicted in FIG. 11. In one or more embodiments, the toggle switch 96 being in the second state causes the microprocessor to process signals from the first set of user input devices 32C, 34C, 56C and the second set of user input devices 90, 92, 94, which enables convenient and ergonomic two-handed use of all user input devices 32C, 34C, 56C, 90, 92, 94, as depicted in FIG. 12. This state enables more complex functions on the mobile device, which may require additional control devices, such as complex applications and video games.

In one or more embodiments, the toggle switch 96 includes a third state in which the microprocessor does not process any signal from any of the user input devices 32C, 34C, 56C, 90, 92, 94. This state may be used if the user does not want any of the user input devices 32C, 34C, 56C, 90, 92, 94 generating signals based on user input. This state may be used, for example, when the battery of the mobile device is low. In one or more embodiments, the toggle switch 96 includes a fourth state in which the microprocessor processes signals from a customized list of the user input devices 32C, 34C, 56C, 90, 92, 94 based upon user customized settings stored on the mobile device and/or on the memory element of the microprocessor. For example, the user may enter the customized settings via the touchscreen of the mobile device, and the customized settings may be downloaded via the data contacts of the case connector and stored on the memory element of the microprocessor.

Figure 13:
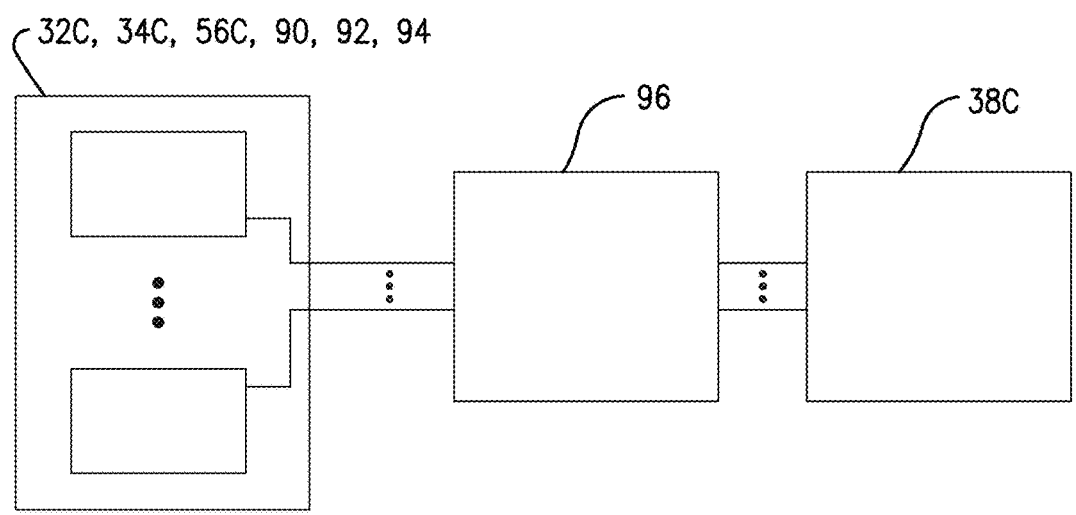
FIG. 13 is block diagram depicting selected components of the detachable case of FIG. 10.
Figure 14:
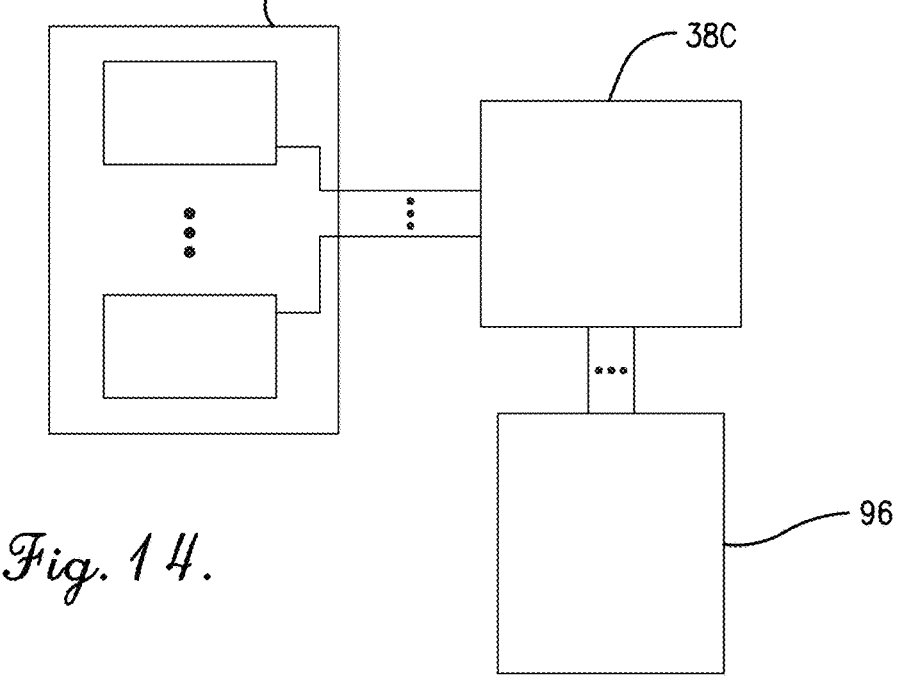
FIG. 14 is block diagram depicting selected components of the detachable case of FIG. 10 in another configuration.

The toggle switch 96 and/or the microprocessor may be configured any number of ways to achieve the various states. For example, in one or more embodiments, the toggle switch 96 may be serially connected with both sets of user input devices 32C, 34C, 56C, 90, 92, 94 so that changing states affects the electrical connection of the user input devices 32C, 34C, 56C, 90, 92, 94 with microprocessor 38C, as schematically depicted in FIG. 13. Alternatively, the toggle switch 96 may be connected with the microprocessor, and the microprocessor may be configured to detect which state the toggle switch 96 is in, and accordingly ignore signals from one or more of the user input devices 32C, 34C, 56C, 90, 92, 94 based on the state of the toggle switch 96, as depicted in FIG. 14. Additionally, the case 10C may include multiple toggle switches. Accordingly, as used herein, "processes signals" includes receiving signals from user input devices selected to be activated in a current state, and transmitting one or more control signals derived those received signals to the mobile device through one or more of the data lanes or data contacts. The user input devices 32C, 34C, 56C, 90, 92, 94 may be configured any number of ways in different states without departing from the scope of the present invention.

Figure 15:
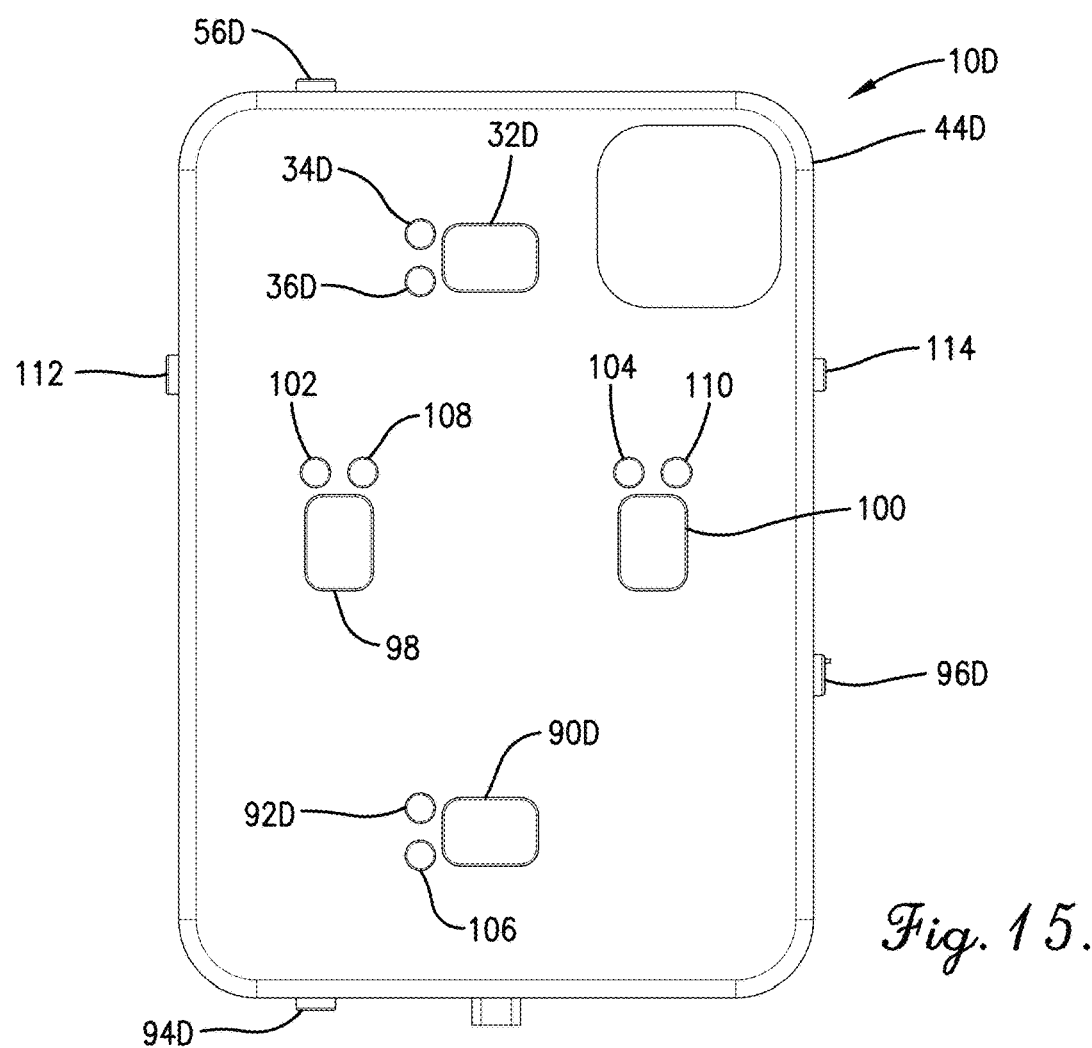
FIG. 15 is a plan view of a back side of a detachable case constructed according to another embodiment of the present invention in which there are two sets of dual-hand user inputs.

A case 10D constructed in accordance with another embodiment of the invention is shown in FIG. 15. The case 10D may comprise substantially similar components as case 10; thus, the components of case 10D that correspond to similar components in case 10 have a 'D' appended to their reference numerals.

The case 10D includes all the features of case 10 and further includes four sets of user input devices with corresponding user input devices proximally located on the sidewalls 44D and one or more toggle switches 96D. In one or more embodiments, each set of the user input devices includes a scrolling device 32D, 90D, 98, 100, first buttons 34D, 92D, 102, 104, second buttons 36D, 106, 108, 110, and side buttons 56D, 94D, 112, 114 located on the sidewalls 44D.

In one or more embodiments, the toggle switch 96D includes four states. The first state causes all the user input devices to be deactivated and/or ignored by the microprocessor.

Figure 16:
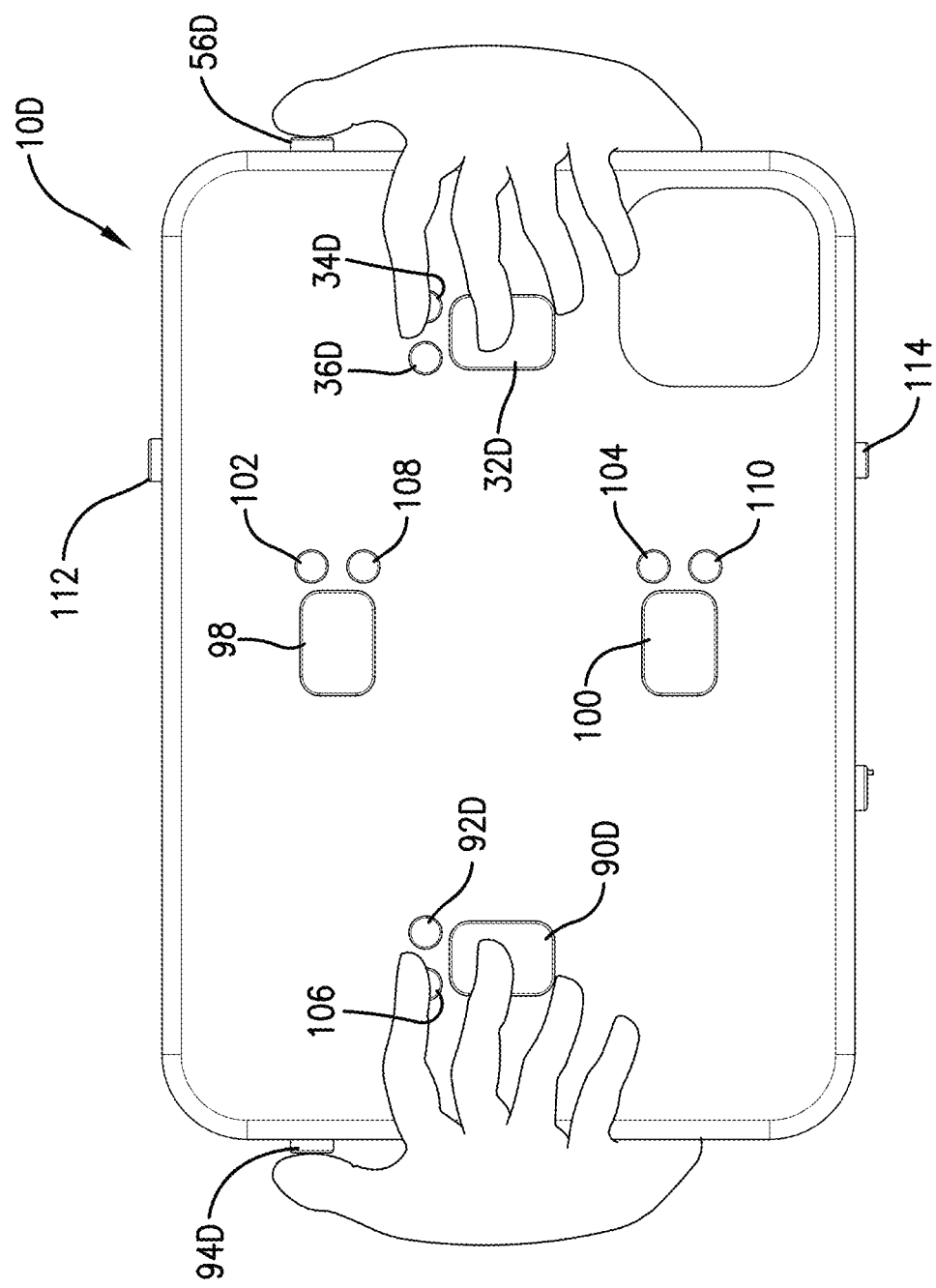
FIG. 16 is a plan view of the back side of the detachable case of FIG. 15 demonstrating one intended use of the detachable case.
Figure 17:
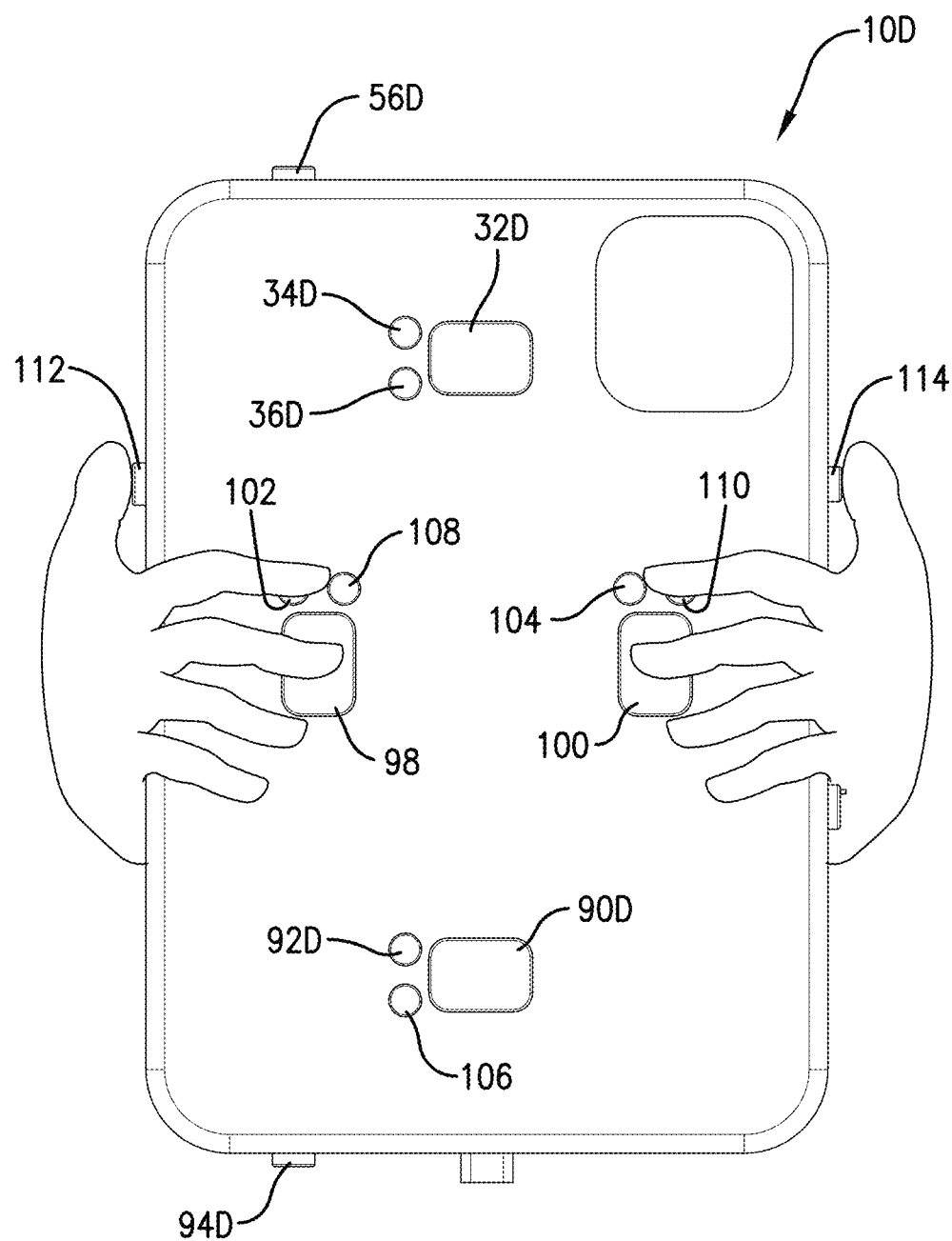
FIG. 17 is a plan view of the back side of the detachable case of FIG. 15 demonstrating another intended use of the detachable case.

The second state causes two sets of the user input devices to be used based on orientation data from the mobile device. For example, the microprocessor may receive an indication of horizontal or vertical orientation from the mobile device via one or more data contact of the adapter and process signals from select sets of the user input devices based on the orientation. As shown in FIG. 16, when the mobile device is horizontally oriented, the microprocessor is configured to only process signals from the first set of user input devices 32D, 34D, 36D, 56D and the second set of user input devices 90D, 92D, 106, 94D. The microprocessor may be configured to ignore or not transmit signals from the other sets of user input devices 98, 100, 102, 104, 108, 110, 112, 114. As shown in FIG. 17, when the mobile device is vertically oriented, the microprocessor is configured to only process signals from the third set of user input devices 98, 102, 108, 112 and the fourth set of user input devices 100, 104, 110, 114. The microprocessor may be configured to ignore or not transmit signals from the other sets of user input devices 32D, 34D, 36D, 56D, 90D, 92D, 106, 94D.

In one or more embodiments, the third state causes the microprocessor to process signals from all sets of user input devices. In one or more embodiments, the fourth state causes the microprocessor to process signals only from user input devices selected from a customized list of the user input devices based upon user customized settings stored on the mobile device and/or on the memory element of the microprocessor. For example, the user may adjust the settings so that only one set of the user input devices are processed by the microprocessor when the toggle switch 96D is in the fourth state. The microprocessor may be configured to receive any number of settings to activate any number of the user input devices without departing from the scope of the present invention.

Figure 18:
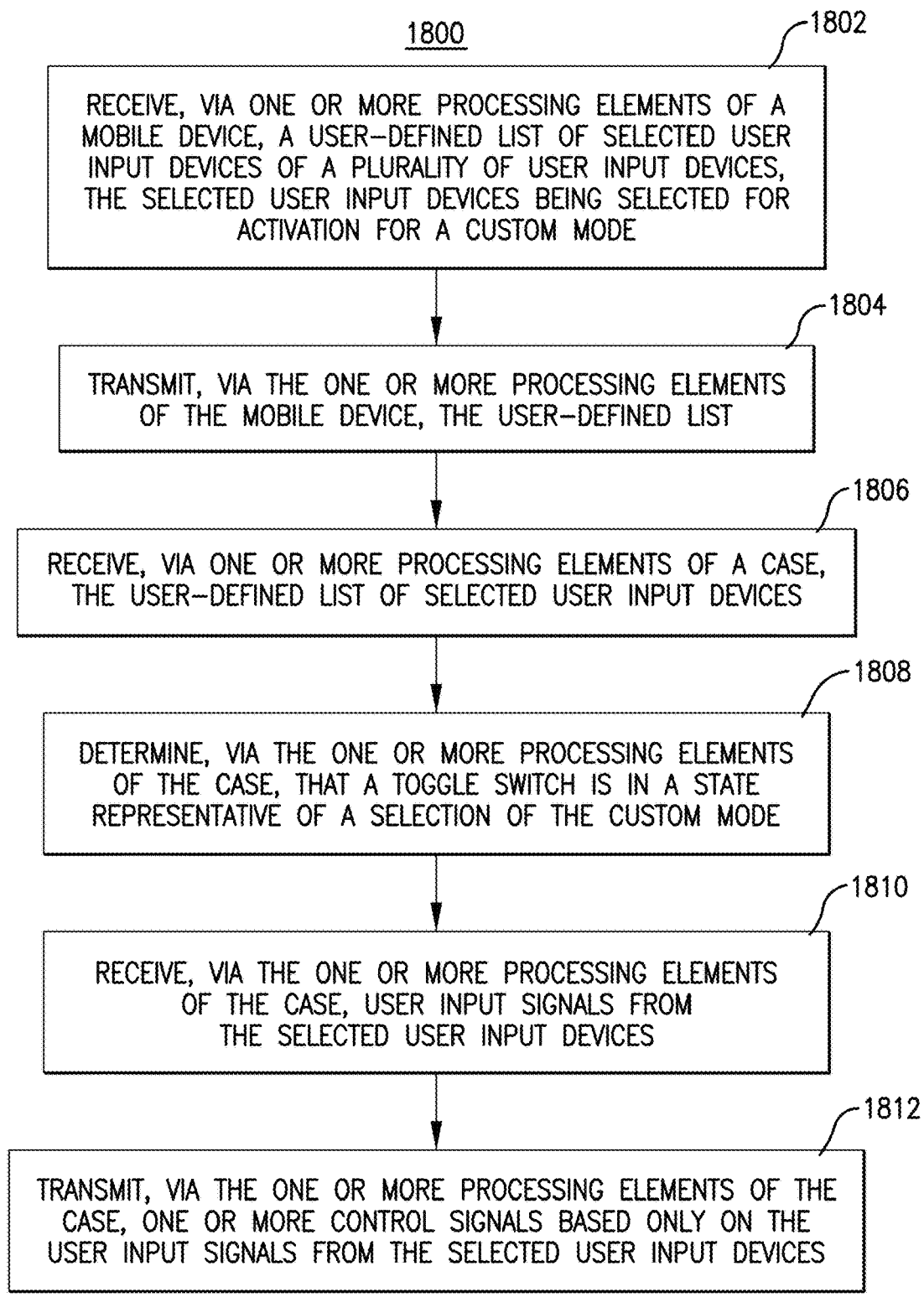
FIG. 18 is a flowchart depicting exemplary steps of a method according to an embodiment of the present invention.

The flow chart of FIG. 18 depicts the steps of an exemplary method 1800 of customizing settings of one or user input devices of a mobile device case that interfaces with a mobile device. In some alternative implementations, the functions noted in the various blocks may occur out of the order depicted in FIG. 18. For example, two blocks shown in succession in FIG. 18 may in fact be executed substantially concurrently, or the blocks may sometimes be executed in the reverse order depending upon the functionality involved. In addition, some steps may be optional.

The method 1800 is described below, for case of reference, as being executed by exemplary devices and components introduced with the embodiments illustrated in FIGS. 1-17. The steps of the method 1800 may be performed by the control system and/or the remote computing device through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more non-transient computer-readable medium(s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 1802, a user-defined list of selected user input devices is received via one or more processing elements of a mobile device. The selected user input devices are chosen for activation in a custom mode. As discussed above, the case may include a plurality of user input devices, including buttons, scroll devices, or the like. The selected user input devices may additionally or alternatively be different sets of user input devices. In one or more embodiments, this step includes receiving from one or more processing elements of the case through the data contacts of the case a list of all user input devices of the case. The mobile device may display the list of all user input devices of the case on the touch screen, and the user may select, via the touchscreen, the user input devices for activation.

Referring to step 1804, the user-defined list of selected user input devices for activation in the custom mode is transmitted via the one or more processing elements of the mobile device. This step may include transmitting the list through one or more of the data contacts of the mobile device in contact with the adapter of the case.

Referring to step 1806, the user-defined list of selected user input devices for activation in the custom mode is received by the one or more processing elements of the case. The one or more processing elements of the case may receive the list through one or more of the data contacts of the adapter. This step may include storing the list on the memory element associated with the one or more processing elements.

Referring to step 1808, the method 1800 may include determining, via the one or more processing elements of the case, that the toggle switch is in a state representative of the selection of the custom mode. The toggle switch may be connected to a digitally high signal/voltage so that when the custom mode is selected via the toggle switch, a pin of the one or more processing elements receives the signal, and the one or more processing elements are configured to interpret this as a selection of the custom mode.

Referring to step 1810, one or more user input signals may be received, via the one or more processing elements of the case, from the one or more selected user input devices. The signals may be received through the toggle switch and/or directly from the selected user input devices. This step may include ignoring, via the one or more processing element of the case, the user input signals from the one or more user input devices of the case that are not on the user-defined list. This step may include generating one or more control signals based on the user input signals from the selected user input devices. For example, the user input signals may need to be formatted for transmitting to the mobile device.

Referring to step 1812, the one or more control signals based only on the user input signals from the selected user input devices are transmitted, via the one or more processing elements of the case, to the mobile device. The control signals may be transmitted via the data contacts of the adapter.

The method 1800 may include additional, less, or alternate steps and/or device(s), including those discussed elsewhere herein.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

The processing element may include processors, microprocessors (single-core and multi-core), microcontrollers, DSPs, field-programmable gate arrays (FPGAs), analog and/or digital application-specific integrated circuits (ASICs), or the like, or combinations thereof. The processing element may generally execute, process, or run instructions, code, code segments, software, firmware, programs, applications, apps, processes, services, daemons, or the like. The processing element may also include hardware components such as finite-state machines, sequential and combinational logic, and other electronic circuits that can perform the functions necessary for the operation of the current invention. The processing element may be in communication with the other electronic components through serial or parallel links that include address busses, data busses, control lines, and the like.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The memory device or element may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element may be embedded in, or packaged in the same package as, the processing element. The memory element may include, or may constitute, a "computer-readable medium". The memory element may store the instructions, code, code segments, software, firmware, programs, applications, apps, services, daemons, or the like that are executed by the processing element.

The communication element may generally allow communication with systems and/or external devices. The communication element may include signal or data transmitting and receiving circuits, such as antennas, amplifiers, filters, mixers, oscillators, digital signal processors (DSPs), and the like. The communication element may establish communication wirelessly by utilizing RF signals and/or data that comply with communication standards such as cellular 2G, 3G, 4G, 5G, or LTE, WiFi, WiMAX, Bluetooth®, BLE, or combinations thereof. The communication element may be in communication with the processing element and the memory element.

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112 (f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A detachable case for a mobile device having a device receptacle with one or more device data contacts and two or more device power contacts, the detachable case comprising:
   a cover body configured to be detachably mounted on the mobile device and having a back side and one or more sidewalls defining an inner space for receiving the mobile device;
   one or more user input devices attached to the back side of the cover body and configured to generate one or more signal based on user input; and
   an adapter attached to the one or more sidewalls and comprising:
   a case connector extending into the inner space and operable to be inserted into the device receptacle and having one or more case data contacts operable to contact the one or more device data contacts and two or more case power contacts operable to contact the two or more device power contacts, and
   a case receptacle having two or more charging power contacts electrically connected to the two or more case power contacts,
   wherein the one or more user input devices are electrically connected to the one or more case data contacts,
   wherein the one or more user input devices comprises a scrolling device and one or more buttons,
   wherein when the detachable case is oriented so that a longitudinal length thereof is vertical, the scrolling device and the one or more buttons are located on a top half of the back side,
   wherein the scrolling device is a first scrolling device and the one or more buttons are one or more first buttons, wherein the one or more user input devices comprises a second scrolling device and one or more second buttons located on a bottom half of the back side.

2. The detachable case of claim 1, wherein when the detachable case is oriented so that a longitudinal length thereof is vertical, the first scrolling device and the second scrolling device are aligned vertically, and the one or more first buttons and the one or more second buttons are aligned vertically.

3. The detachable case of claim 2, wherein the one or more user input devices comprises: a third scrolling device and one or more third buttons positioned in a region of the back side between the first and second scrolling devices; and a fourth scrolling device and one or more fourth buttons positioned in the region of the back side and spaced apart laterally from the third scrolling device and the one or more third buttons.

4. The detachable case of claim 2, wherein the one or more sidewalls includes a longitudinal sidewall, the one or more first buttons and the one or more second buttons being positioned between the longitudinal sidewall and the first and second scrolling devices, further comprising two or more additional user input devices attached to the longitudinal sidewall and electrically connected to the one or more case data contacts.

5. The detachable case of claim 4, further comprising a toggle switch having two or more states comprising: a first state in which the first scrolling device and the one or more first buttons are active; and a second state in which the user input devices and the additional user input devices are active.

6. The detachable case of claim 5, wherein when the toggle switch is in the first state, the additional user input devices, the second scrolling device, and the one or more second buttons are disconnected from the one or more case data contacts.

7. The detachable case of claim 5, wherein the toggle switch includes a third state in which the additional user input devices and the user input devices are disconnected from the one or more case data contacts.

8. The detachable case of claim 1, wherein when the detachable case is oriented so that a longitudinal length thereof is vertical, the scrolling device and the one or more buttons are located in a middle third of the back side between a top third and a bottom third.

9. The detachable case of claim 1, wherein when the detachable case is oriented so that a longitudinal length thereof is vertical, the one or more buttons are horizontally aligned with a portion of the scrolling device.

10. The detachable case of claim 9, wherein the one or more buttons comprises a top button and a bottom button vertically aligned with the top button and positioned below the top button.

11. The detachable case of claim 1, further comprising a plurality of LEDs positioned on outer margins of the back side of the cover body.

12. The detachable case of claim 1, further comprising one or more microprocessors in communication with the one or more user input devices, wherein the one or more user input devices are electrically connected to the one or more case data contacts via the one or more microprocessors.

13. A detachable case for a mobile device having a device receptacle with one or more device data contacts and two or more device power contacts, the detachable case comprising:
   a cover body configured to be detachably mounted on the mobile device and having a back side and one or more sidewalls defining an inner space for receiving the mobile device;

one or more first user input devices attached to the back side of the cover body and configured to generate one or more first user input signals;

one or more second user input devices attached to the back side of the cover body and configured to generate one or more second user input signals;

a case connector extending into the inner space and operable to be inserted into the device receptacle and having one or more case data contacts operable to contact the one or more device data contacts and two or more case power contacts operable to contact the two or more device power contacts; and a toggle switch attached to the cover body and shiftable between at least two states comprising:

a first state in which the one or more first user input signals and the one or more second user input signals are transmitted to the one or more case data contacts, and a second state in which only the one or more first user input signals are transmitted to the one or more case data contacts.

14. The detachable case of claim 13, wherein the toggle switch is configured to disconnect the one or more second user input devices from the one or more case data contacts when in the second state.

15. The detachable case of claim 13, further comprising one or more microprocessors in communication with the one or more first user input devices, the one or more second user input devices, the one or more device data contacts, and the two or more device power contacts, wherein the toggle switch is shiftable to: a third state in which the one or more microprocessors does not transmit the one or more first user input signals or the one or more second user input signals; and a fourth state in which the one or more microprocessors transmit one or more custom control signals based upon user customized settings.

* * * * *